US006512827B1

(12) United States Patent
Kitamura

(10) Patent No.: US 6,512,827 B1
(45) Date of Patent: Jan. 28, 2003

(54) PORTABLE TERMINAL DEVICE

(75) Inventor: Toshiyasu Kitamura, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/439,908

(22) Filed: Nov. 12, 1999

(30) Foreign Application Priority Data

Nov. 12, 1998 (JP) .......................................... 10-322146

(51) Int. Cl.[7] .................................................. H04M 1/00

(52) U.S. Cl. .............. 379/433.01; 379/368; 379/433.07

(58) Field of Search ................................ 379/368, 429, 379/433.07, 433.01; 200/5 R

(56) References Cited

U.S. PATENT DOCUMENTS 4,698,464 A * 10/1987 Tanaka et al. ............ 200/16 D
5,625,688 A * 4/1997 Ford et al. ............. 379/433.03
5,734,136 A 3/1998 Newcomer et al. ......... 200/5 A

FOREIGN PATENT DOCUMENTS

DE 30 38 613 A1 4/1981 ............. G06F/3/02
EP 0 685 954 A2 12/1995 ............ H04M/1/02
GB 1 543 121 3/1979 .......... H01H/13/50

* cited by examiner

*Primary Examiner*—Jack Chiang
*Assistant Examiner*—Quynh Nguyen
(74) *Attorney, Agent, or Firm*—Pearne & Gordon LLP

(57) ABSTRACT

A water-proof structure of a key sheet periphery portion of a portable terminal device. The device includes an upper cover having a rib with a substantially convex cross-section provided around an operating portion, a printed board for receiving an operation input from the operating portion, and a key sheet provided between the upper cover and the printed board, having a rib with a substantially convex cross-section provided contacting with the printed board with a center shared with the rib with the substantially convex cross-section provided in the upper cover. The key sheet is provided with input buttons (key top) constituting the operating portion.

20 Claims, 4 Drawing Sheets

PORTABLE TERMINAL DEVICE

BACKGROUND OF THE INVENTION

1. Field of the Invention

The present invention relates to a portable terminal device and in particular, it relates to one provided with a water-proof structure with improved assembling property and water-proof property so as to prevent entrance of water or the like from the periphery of an operating portion into the inside of the main body of the device.

2. Description of the Related Art

Conventionally, as portable terminal devices, such as a portable phone device and a PHS, one shown in FIGS. 5A and 5B has been known. That is, according to the water-proof structure of the key sheet periphery portion of the portable terminal device shown in FIG. 5B, a rib 12 is provided in a key sheet 11 made from a silicone rubber, with the rib 12 contacting with an upper cover 10 so as to prevent entrance of water or the like from the surface portion of the key sheet 11 into the inside of the main body of the device, such as a printed board 13. FIG. 5A is an enlarged view of the portion of the FIG. 5B surrounded by the two-dot chain line, showing an example of the rib 12 accurately contacting with the upper cover 10.

Recently, tasks such as a small size, a light weight and weight reduction of a portable terminal device have been the principal part in designing portable terminal devices. With the conventional shapes, it is difficult to achieve the tasks. That is, with the conventional water-proof structure of the key sheet periphery portion of the portable terminal device, the surface of the upper cover 10 contacting with the rib 12 is narrow, and thus a problem arises in that the water-proof property becomes insufficient in the case the rib 12 provided in the key sheet 11 is displaced in handling the key sheet of the portable terminal device as shown in FIGS. 6A and 6B.

SUMMARY OF THE INVENTION

In order to solve the above problem, an object of the invention is to provide a portable terminal device provided with a water-proof structure with improved assembling property and water-proof property so as to prevent entrance of water or the like from the periphery of an operating portion into the inside of the main body of the device.

In order to achieve the above object, according to a first aspect of the invention, there is provided a portable terminal device comprising: an upper cover having a rib with a substantially convex cross-section provided around an operating portion; a printed board for receiving an operation input from the operating portion; and a water-proof member provided between the upper cover and the printed board, having a rib with a substantially convex cross-section provided contacting with the printed board with a center shared with the rib with the substantially convex cross-section provided in the upper cover.

According to a second aspect of the invention, there is provided a portable terminal device comprising: an upper cover having a rib with a substantially convex cross-section provided around an operating portion; a printed board for receiving an operation input from the operating portion; and a key sheet provided with input buttons constituting the operating portion, provided between the upper cover and the printed board, having a rib with a substantially convex cross-section provided contacting with the printed board with a center shared with the rib with the substantially convex cross-section provided in the upper cover.

DETAILED DESCRIPTION OF THE PREFERRED EMBODIMENT

Hereinafter, an embodiment of the invention will be described with reference to the accompanying drawings.

Figure 1:
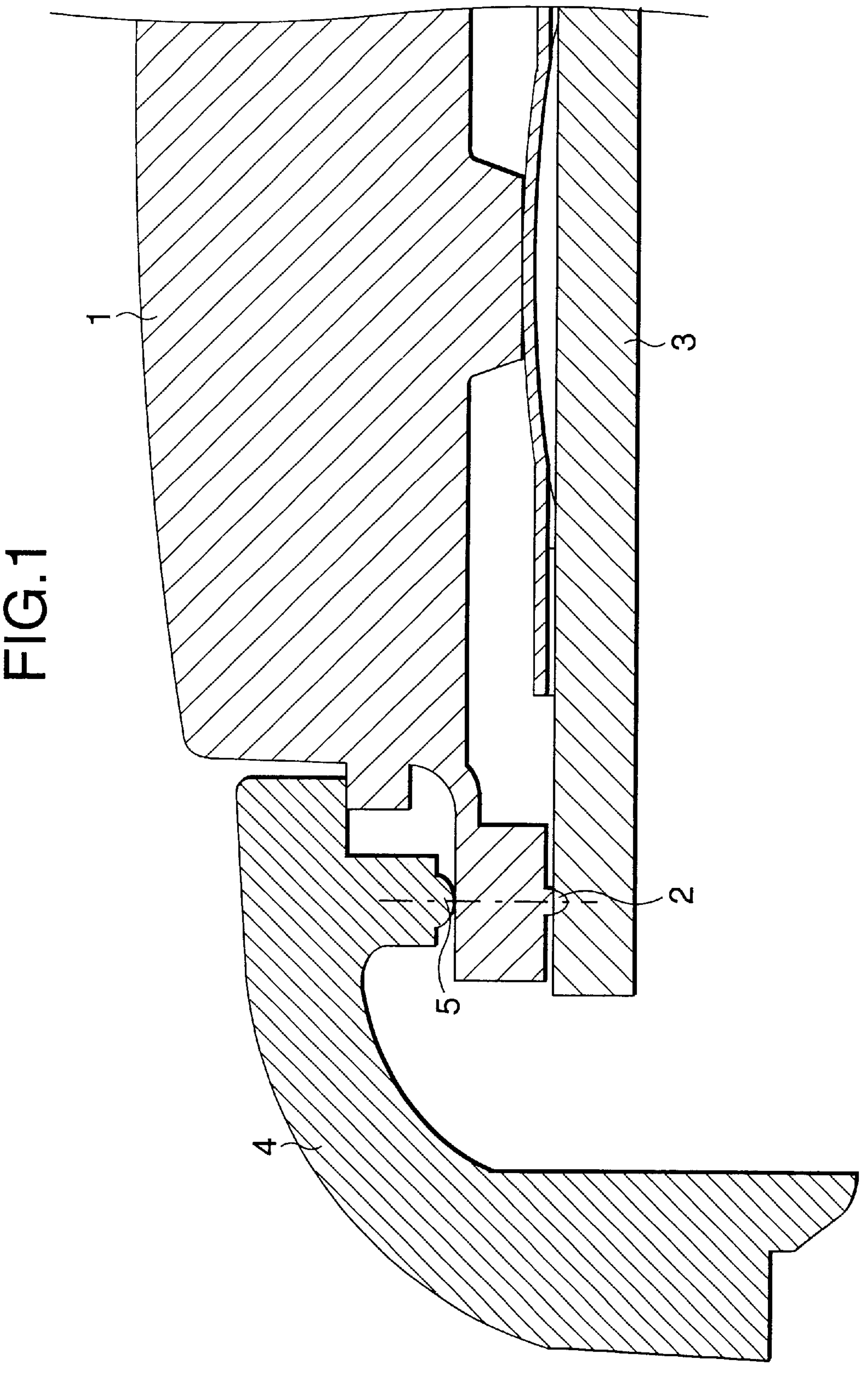
FIG. 1 is an enlarged cross-sectional view showing a part of the configuration of a portable terminal device according to an embodiment of the invention.

FIG. 1 is an enlarged cross-sectional view showing a part of the configuration of a portable terminal device according to an embodiment of the invention. In FIG. 1, the water-proof structure of the key sheet periphery portion of the portable terminal device comprises an upper cover 4 having a rib 5 with a substantially convex cross-section provided around an operating portion, a printed board 3 for receiving the operation input from the operating portion, and a key sheet 1 provided between the upper cover 4 and the printed board 3, having a rib 2 with a substantially convex cross-section provided contacting with the printed board 3 with the center shared with the rib 5 with the substantially convex cross-section provided in the upper cover 4.

The key sheet 1 is provided with input buttons (key top) comprising the operating portion. Moreover, since the input buttons (key top) comprising the operating portion are a switch, the configuration including the rib 2 of the key sheet 1 to be the breakwater for preventing entrance of water or the like into the switch serves as a water-proof member.

Furthermore, the key sheet 1 and the rib 2 with the substantially convex cross-section provided therein are made from one material as shown in FIG. 1, that is, made of an elastic member such as a silicone rubber.

Moreover, as shown in FIG. 1, the rib 2 provided in the key sheet 1 has a substantially V-shaped cross-section smaller than that of the rib 5 provided in the upper cover 4. The rib 5 has a substantially half circular cross-section, with the cross-sectional area larger than that of the rib 2. According to the rib 2 having the substantially V-shaped cross-section, even when the key sheet 1 is deformed by the key operation, since the tip portion of the V-shape bites into the printed board deeply, the key sheet 1 can rapidly restore the original position without dislocation. In this context, the rib 2 having the substantially convex cross-section has a compression margin with respect to the printed board 3.

Figure 2:
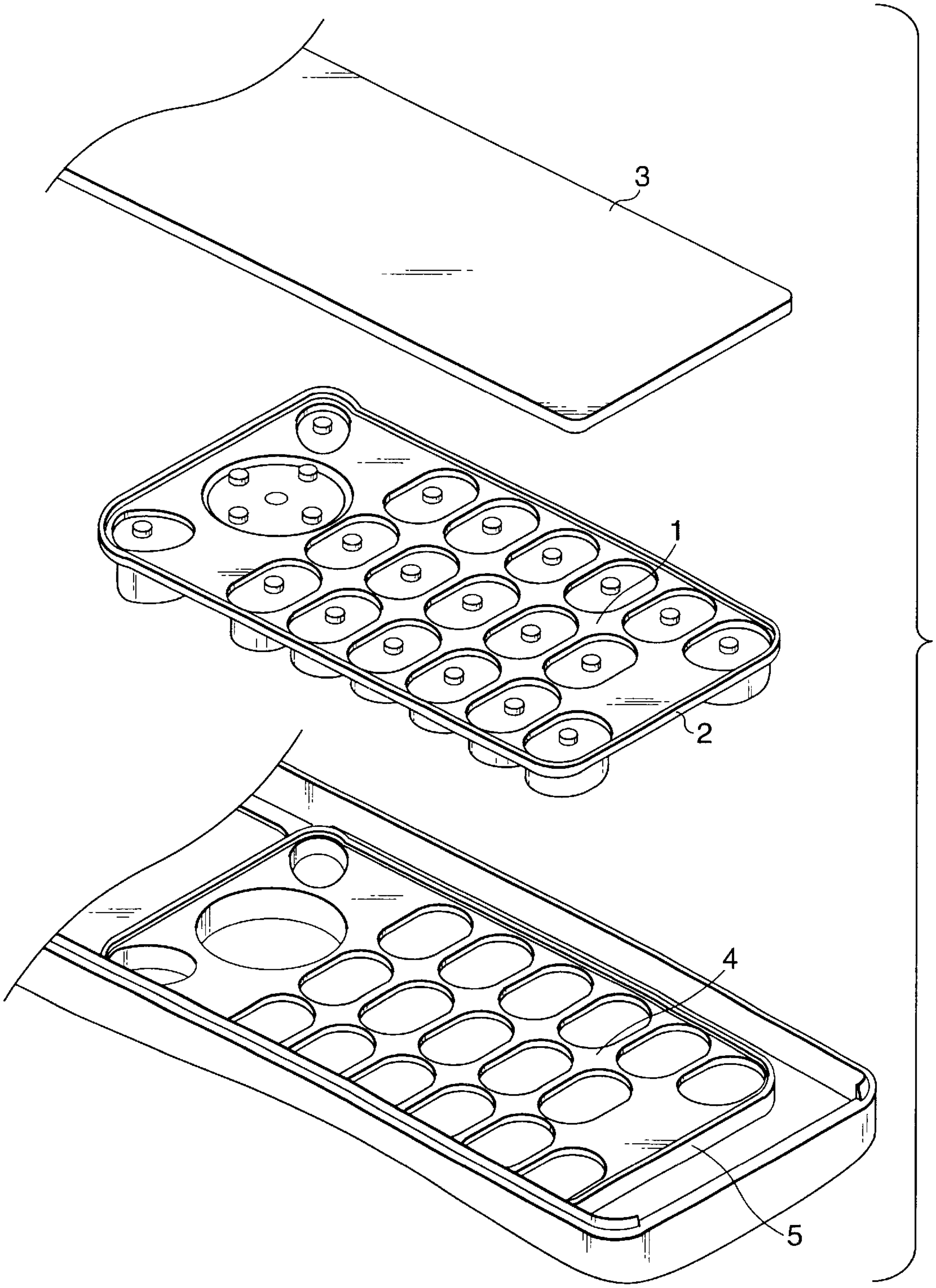
FIG. 2 is an exploded perspective view showing the configuration of the portable terminal device according to the embodiment of the invention, such as a portable phone device.

FIG. 2 is an exploded perspective view showing the configuration of the portable terminal device according to the embodiment of the invention, such as a portable phone device. In the portable terminal device shown in FIG. 2, the rib 5 with a substantially convex cross-section provided in the upper cover 4 elongates around the entire periphery of the operating portion without interruption. Moreover, the rib 2 with a substantially convex cross-section provided contacting with the printed board 3 in the water-proof member, that is, the key sheet 1 is provided, with the center shared with the rib 5 with a substantially convex cross-section provided in the upper cover 4, elongating around the entire periphery of the operating portion without interruption.

Figure 3:
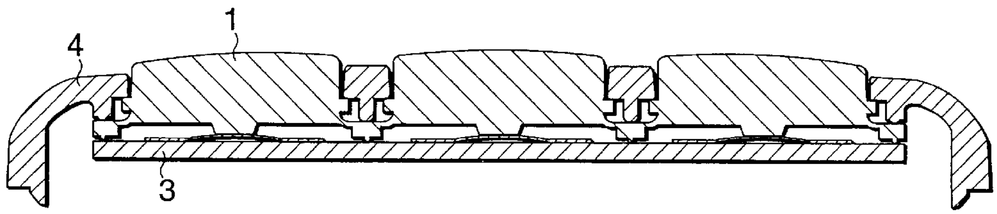
FIG. 3 is a cross-sectional view showing a part of the configuration of the portable terminal device according to the embodiment of the invention.

FIG. 3 is a cross-sectional view showing a part of the configuration of the portable terminal device according to the embodiment of the invention like FIG. 1, but of a range wider than that of FIG. 1. As shown in FIG. 3, the above-described ribs are provided in the upper cover 4 and the key sheet 1 per each input button (key top).

Figure 4A:
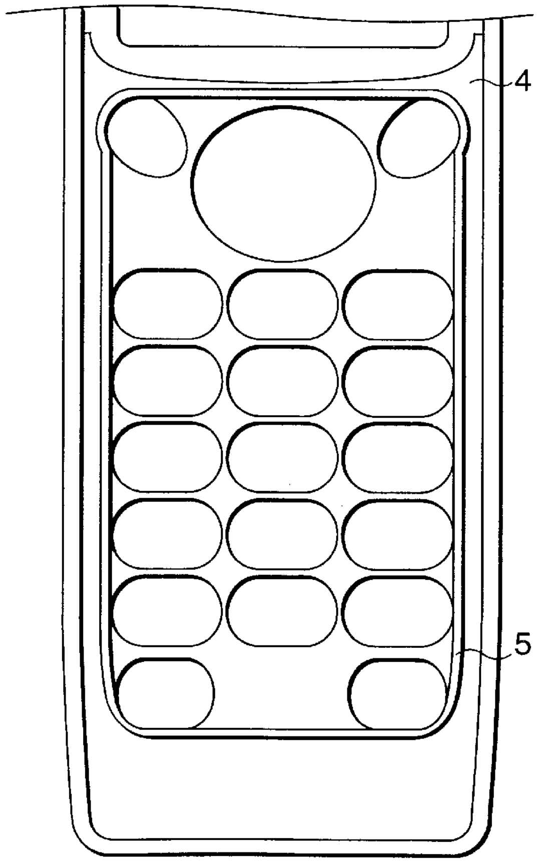
FIGS. 4A and 4B are exploded plan views showing the configurations of ribs each elongating around the entire periphery of an operating portion of the embodiment of the invention without interruption.
Figure 4B:
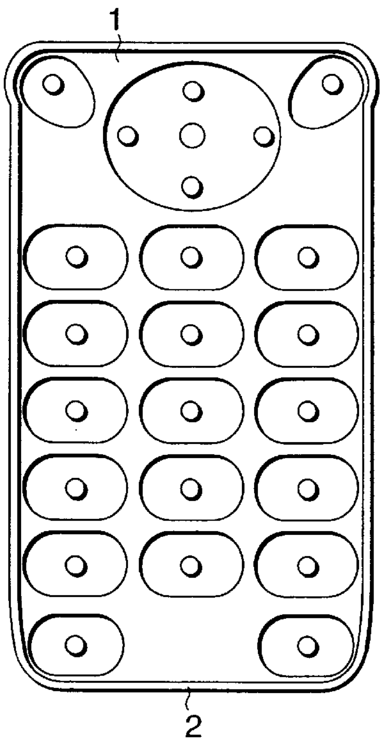
Figure 5A:
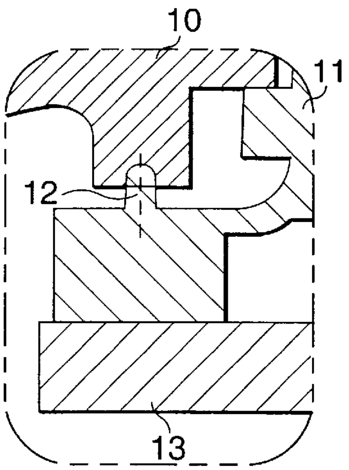
FIG.5A PRIOR ART
FIGS. 5A and 5B are cross-sectional views showing a part of the configuration of a conventional portable terminal device.
Figure 5B:
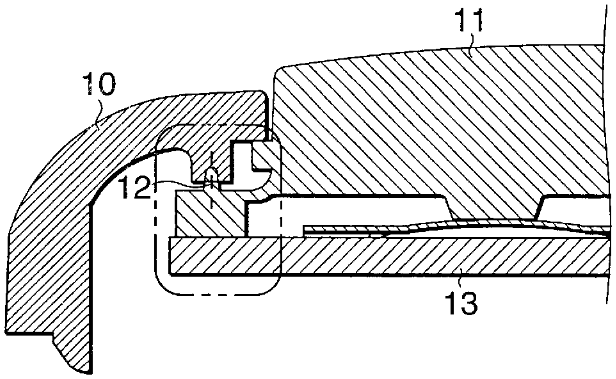
FIG.5B PRIOR ART
Figure 6A:
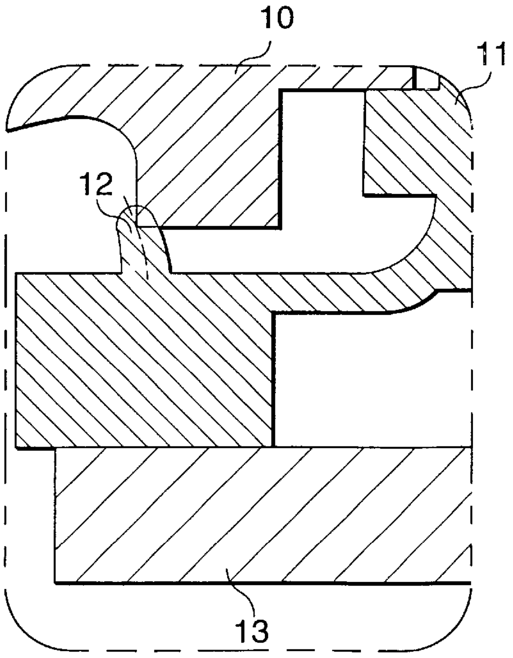
FIG.6A PRIOR ART
FIGS. 6A and 6B are cross-sectional views showing the state of displacement generated by handling a key sheet in the conventional configuration.
Figure 6B:
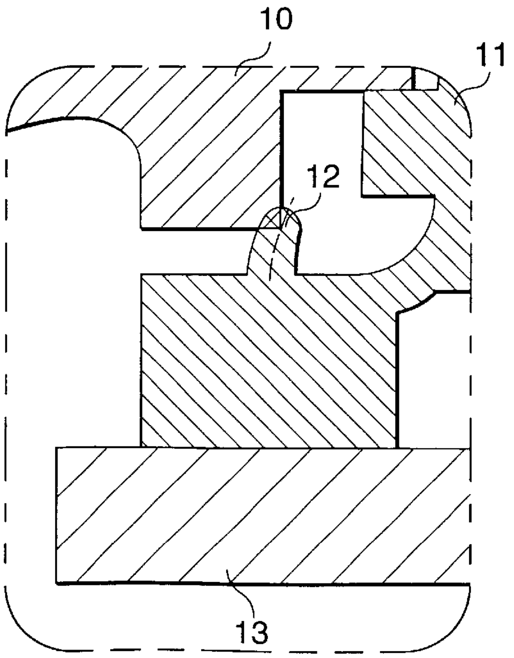
FIG.6B PRIOR ART

FIGS. 4A and 4B show the configurations of the rib 5 and the rib 2 each elongating around the entire periphery of the operating portion without interruption shown in FIG. 2. That is, FIG. 4A shows the configuration of the rib 5 provided in the upper cover 4, and FIG. 4B shows the configuration of the rib 2 provided in the key sheet 1.

As apparent from the above description, the invention provides a portable terminal device comprising an upper cover having a rib with a substantially convex cross-section provided around an operating portion, a printed board for receiving the operation input from the operating portion, and a water-proof member provided between the upper cover and the printed board, having a rib with a substantially convex cross-section provided contacting with the printed board with the center shared with the rib with the substantially convex cross-section provided in the upper cover, so that the effect of preventing entrance of water or the like from the periphery of the operating portion into the inside of the main body of the device can be achieved.

What is claimed is:

1. A portable terminal device comprising:

an upper cover having a rib with a substantially convex cross-section provided around an operating portion;

a printed board for receiving an operation input from the operating portion; and a water-proof member provided between the upper cover and the printed board, having a rib with a substantially convex cross-section provided contacting with the printed board;

wherein a center line along an extension direction of the rib passes through a center of the substantially convex cross section of the rib provided in the upper cover, and further wherein said center line also passes through a center of the substantially convex cross section of the rib provided in the water-proof member.

2. The portable terminal device according to claim 1, wherein the rib with the substantially convex cross-section provided in the upper cover elongates around an entire periphery of the operating portion without interruption.

3. The portable terminal device according to claim 1, wherein the rib with the substantially convex cross-section provided contacting with the printed board in the water-proof member is provided, with the center shared with the rib with the substantially convex cross-section provided in the upper cover, elongating around an entire periphery of the operating portion without interruption.

4. The portable terminal device according to claim 1, wherein the water-proof member and the rib with the substantially convex cross-section provided therein are made of an elastic member.

5. The portable terminal device according to claim 1, wherein the rib with the substantially convex cross-section provided contacting with the printed board in the water-proof member is provided with a compression margin with respect to the printed board.

6. The portable terminal device according to claim 1, wherein the rib provided in the upper cover has a substantially half circular cross-section and the rib provided in the water-proof member has a substantially V-shaped cross-section, with an area formed by the half circle set larger than an area formed by the V shape.

7. A portable terminal device comprising:

an upper cover having a rib with a substantially convex cross-section provided around an operating portion;

a printed board for receiving an operation input from the operating portion; and a key sheet provided with input buttons constituting the operating portion, provided between the upper cover and the printed board, having a rib with a substantially convex cross-section provided contacting with the printed board;

wherein a center line along an extension direction of the rib passes through a center of the substantially convex cross section of the rib provided in the upper cover, and further wherein said center line also passes through a center of the substantially convex cross section of the rib provided in the water-proof member.

8. The portable terminal device according to claim 7, wherein the rib with the substantially convex cross-section provided in the upper cover elongates around an entire periphery of the operating portion without interruption.

9. The portable terminal device according to claim 7, wherein the rib with the substantially convex cross-section provided contacting with the printed board in the key sheet is provided, with the center shared with the rib with the substantially convex cross-section provided in the upper cover, elongating around an entire periphery of the operating portion without interruption.

10. The portable terminal device according to claim 7, wherein the key sheet and the rib with the substantially convex cross-section provided therein are made of an elastic member.

11. The portable terminal device according to claim 7, wherein the rib with the substantially convex cross-section provided contacting with the printed board in the key sheet is provided with a compression margin with respect to the printed board.

12. The portable terminal device according to claim 7, wherein the rib provided in the upper cover has a substantially half circular cross-section and the rib provided in the key sheet has a substantially V-shaped cross-section, with an area formed by the half circle set larger than an area formed by the V shape.

13. A portable terminal device comprising:

an upper cover having a first rib with a substantially convex cross-section provided around an operating portion;

a printed board for receiving an operation input from the operating portion; and a water-proof member provided between the upper cover and the printed board, having a second rib with a substantially convex cross-section provided contacting with the printed board, with said first rib in contact with the water-proof member, wherein a center line parallel to the cross-sections passes through a point where the first rib contacts the water-proof member and also passes through a point where the second rib contacts the printed board is perpendicular to a tangential line parallel to the cross-sections which is tangential to the point where the first rib contacts the water-proof member and said center line is also perpendicular to another tangential line parallel to said cross-sections which is tangential to the point where the second rib contacts the printed board.

14. The portable terminal device according to claim 13, wherein the first rib elongates around an entire periphery of the operating portion without interruption.

15. The portable terminal device according to claim 13, wherein the second rib elongates around an entire periphery of the operating portion without interruption.

16. The portable terminal device according to claim 13, wherein the water-proof member and the second rib are made of an elastic member.

17. The portable terminal device according to claim 13, wherein the second rib is provided with a compression margin with respect to the printed board.

18. The portable terminal device according to claim 13, wherein the first rib has a substantially half circular cross-section and the second rib has a substantially V-shaped cross-section, with an area formed by the substantially half circular cross-section of the first rib being larger than an area formed by the V-shaped cross-section of the second rib.

19. A portable terminal device comprising:

an upper cover having a first rib with a substantially convex cross-section provided around an operating portion;

a printed board for receiving an operation input from the operating portion; and a key sheet provided with input buttons constituting the operating portion, provided between the upper cover and the printed board, having a second rib with a substantially convex cross-section provided contacting with the printed board;

wherein a center line parallel to the cross-sections passes through a point where the first rib contacts the water-proof member and also passes through a point where the second rib contacts the printed board is perpendicular to a tangential line parallel to the cross-sections which is tangential to the point where the first rib contacts the water-proof member and said center line is also perpendicular to another tangential line parallel to said cross-sections which is tangential to the point where the second rib contacts the printed board.

20. The portable terminal device according to claim 19, wherein the first rib has a substantially half circular cross-section and the second rib has a substantially V-shaped cross-section, with an area formed by the substantially half circular cross-section of the first rib being larger than an area formed by the V-shaped cross-section of the second rib.

* * * * *